(12) United States Patent
Hofland et al.

(10) Patent No.: US 10,310,119 B2
(45) Date of Patent: Jun. 4, 2019

(54) METHOD AND APPARATUS FOR SEISMIC NOISE REDUCTION

(75) Inventors: Gregg S. Hofland, Parker, CO (US); Huub Douma, New York, NY (US); Jacques Leveille, Houston, TX (US)

(73) Assignee: ION Geophysical Corporation, Houston, TX (US)

(*) Notice: Subject to any disclaimer, the term of this patent is extended or adjusted under 35 U.S.C. 154(b) by 1278 days.

(21) Appl. No.: 14/128,884

(22) PCT Filed: Jun. 22, 2012

(86) PCT No.: PCT/US2012/043866
§ 371 (c)(1),
(2), (4) Date: Dec. 23, 2013

(87) PCT Pub. No.: WO2012/178099
PCT Pub. Date: Dec. 27, 2012

(65) Prior Publication Data
US 2014/0112099 A1 Apr. 24, 2014

Related U.S. Application Data

(60) Provisional application No. 61/501,110, filed on Jun. 24, 2011.

(51) Int. Cl.
*G01V 1/36* (2006.01)

(52) U.S. Cl.
CPC ........ *G01V 1/362* (2013.01); *G01V 2210/322* (2013.01)

(58) Field of Classification Search
CPC . G01V 1/32; G01V 1/301; G01V 1/28; G01V 1/303

USPC .............................................. 702/13, 16, 14
See application file for complete search history.

(56) References Cited

U.S. PATENT DOCUMENTS

| 3,380,435 A | 4/1968 | Wagner |
| 5,563,949 A * | 10/1996 | Bahorich ............... G01V 1/301 |
| | | 702/13 |
| 5,892,732 A | 4/1999 | Gersztenkorn |
| (Continued) | | |

FOREIGN PATENT DOCUMENTS

GB      2385919 A      9/2003

OTHER PUBLICATIONS

Gibbson "Thedetection of low magnitude seismic events using array-based waveform correlation." (Year: 2005).*

(Continued)

*Primary Examiner* — Regis J Betsch
*Assistant Examiner* — Kaleria Knox
(74) *Attorney, Agent, or Firm* — Dorsey & Whitney LLP

(57) ABSTRACT

Methods, apparatuses, and systems are disclosed that reduce seismic noise. In one embodiment, a method of processing seismic data includes accessing seismic data representative of a plurality of seismic input traces acquired by one or more seismic sensors. The method also includes stacking the plurality of seismic input traces into a stacked trace. The method also includes generating, utilizing at least one processor unit, a function of similarity between at least two of the plurality of seismic input traces. The method also includes scaling at least one of the seismic input traces or the stacked trace with the function of similarity.

20 Claims, 10 Drawing Sheets

(56) References Cited

U.S. PATENT DOCUMENTS

| | | | | |
|---|---|---|---|---|
| 5,940,778 A | * | 8/1999 | Marfurt | G01V 1/28 |
| | | | | 702/13 |
| 6,092,026 A | * | 7/2000 | Bahorich | G01V 1/32 |
| | | | | 702/13 |
| 6,131,071 A | * | 10/2000 | Partyka | G01V 1/301 |
| | | | | 702/16 |
| 7,616,524 B1 | | 11/2009 | Gersztenkorn | |
| 8,380,435 B2 | | 2/2013 | Kumaran et al. | |
| 2003/0018435 A1 | * | 1/2003 | Jenner | G01V 1/303 |
| | | | | 702/14 |
| 2007/0064535 A1 | | 3/2007 | Burnstad | |

OTHER PUBLICATIONS

Liu et al., "Stacking Seismic Data Using Local Correlation", Geophysics, 74-3, 6 pages, May-Jun. 2009.
Luo et al., "Velocity Analysis Using Weighted Semblance", CWP-652, Oct. 2010, 8 pages.
International Search Report and Written Opinion, PCT/US2012/043866, 12 pages, dated May 2, 2013.

* cited by examiner

METHOD AND APPARATUS FOR SEISMIC NOISE REDUCTION

CROSS REFERENCE TO RELATED APPLICATIONS

This patent application claims priority to and the benefit of PCT Application number PCT/US2012/043866 entitled "METHOD AND APPARATUS FOR SEISMIC NOISE REDUCTION" filed on Jun. 22, 2012, and also claims priority to and the benefit of U.S. provisional patent application No. 61/501,110 filed on Jun. 24, 2011 entitled "Mean Covariance Imaging," both of which are hereby incorporated by reference in their respective entireties for all purposes.

TECHNICAL FIELD

This disclosure relates generally to geophysical data processing, and more particularly to seismic noise reduction during the processing of acquired seismic data.

BACKGROUND

Petrochemical products such as oil and gas are ubiquitous in society and can be found in everything from gasoline to children's toys. Because of this, the demand for oil and gas remains high. In order to meet this high demand, it is important to locate oil and gas reserves in the Earth. Scientists and engineers conduct "surveys" utilizing, among other things, seismic and other remote sensing exploration techniques to find oil and gas reservoirs within the Earth, to monitor changes in the subsurface of the Earth caused by drilling, hydraulic fracturing (also known as "fracking"), and other oil and gas extraction techniques, and so forth. By observing the seismic signals detected by one or more seismic sensors or receivers (such as a geophone, accelerometer, hydrophone, etc.) during the survey, the geophysical data pertaining to signals may be used to, for example, help create an image of the subsurface of the earth, to indicate the composition of the subsurface proximate the survey location, to indicate changes in the subsurface, to indicate a location of a seismic source event, and so forth.

Signals recorded in seismic sensors typically contain noise, which may include random noise and/or coherent noise (e.g., trucks driving on the surface of the earth, drilling, etc.). Furthermore, errors in the recording or transmitting equipment, and/or incorrectly sampled data may result in a signal containing undesirable "noise." To help reduce noise, multiple seismic input traces can be stacked or summed together to create a stacked trace with an improved signal-to-noise ratio. The stacked trace typically represents an improvement as compared with individual seismic input traces, but even the stacked trace can still include noise and may even be unusable without further noise reduction efforts.

As just one example, imaging of passive data in micro-seismic studies typically includes imaging seismic events of relatively small magnitude. The events may be buried in substantial amounts of background noise of various types, which may make it difficult to identify the events. In imaging such data, stacking can help, to some degree, reduce the impact of the noise.

In some circumstances (including passive, micro-seismic studies), there may only be a small number of traces to stack, which typically results in less noise reduction capability. In these cases, noise may overshadow the arrival of the source event in the individual traces, even if stacking is employed. The present disclosure presents a method to reduce the impact of the noise and as such, in some embodiments, improve the ability to image weak events present in passive seismic data studies such as those acquired in micro-seismic monitoring.

SUMMARY

Figure 1:
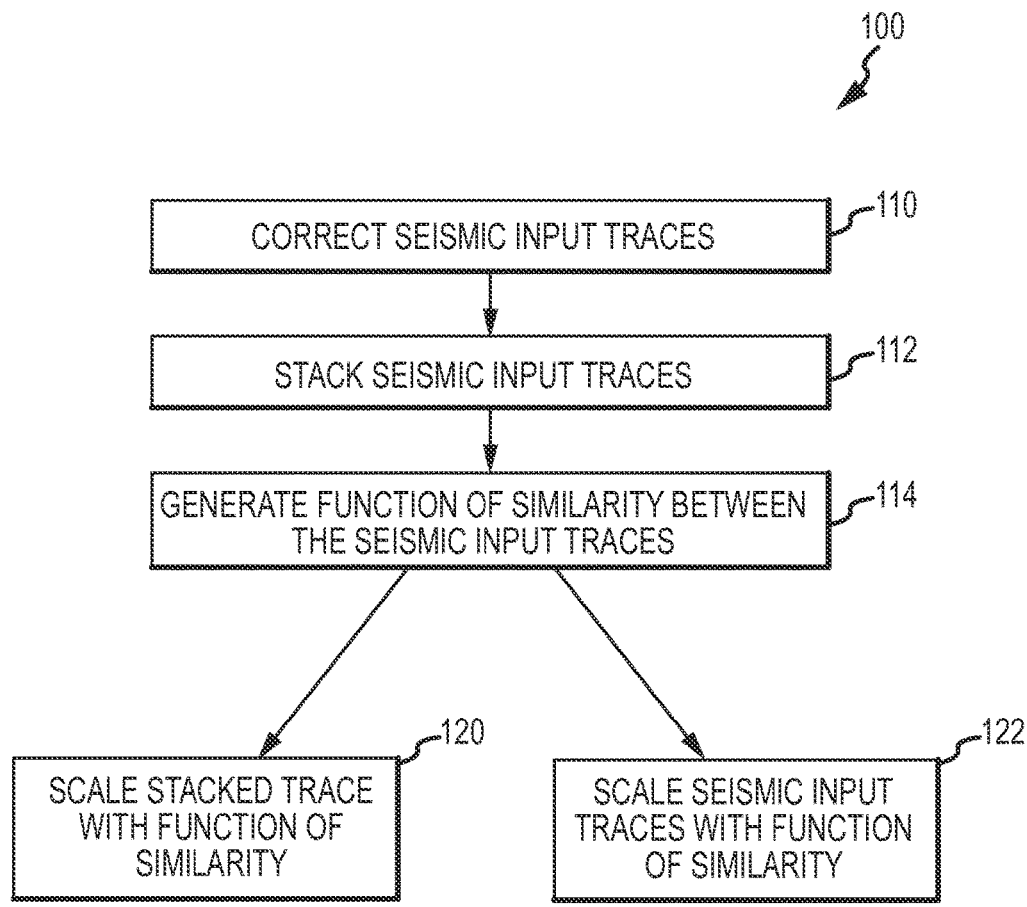
FIG. 1 is a flowchart of a method for seismic noise reduction.

In one embodiment, a sample method of processing seismic data includes accessing seismic data representative of a plurality of seismic input traces acquired by one or more seismic sensors. The method also includes stacking the plurality of seismic input traces into a stacked trace. The method also includes generating, utilizing at least one processor unit, a function of similarity between at least two of the plurality of seismic input traces. The method also includes scaling at least one of the seismic input traces or the stacked trace with the function of similarity.

In another embodiment, a sample method includes correcting a plurality of seismic input traces and stacking the corrected plurality of seismic input traces into a stacked trace. The method also includes generating a plurality of covariance matrices measuring the similarity of the corrected seismic input traces over a respective plurality of sample windows. The method also includes generating a plurality of mean values, each mean value representative of a plurality of elements of each respective covariance matrix, each mean value corresponding to one of the plurality of sample windows. The method also includes combining the plurality of mean values into a function of similarity, and scaling the stacked trace with the function of similarity. The method also includes storing data representative of at least one of the scaled at least one seismic input trace, the scaled stacked trace, or a derived property from the scaled at least one seismic input trace or the scaled stacked trace in a computer readable tangible storage medium In another embodiment, a sample system includes an interface configured to access data representative of a plurality of seismic input traces acquired by one or more seismic sensors. The system also includes a processor unit coupled to the interface and configured to stack the received plurality of seismic input traces into a stacked trace, generate a function of similarity between at least two of the plurality of seismic input traces, and scale at least one of the seismic input traces or the stacked trace with the function of similarity. The system also includes a storage device configured to store data responsive to said scaling.

In another embodiment, a sample system for processing seismic data includes a storage device for storing seismic data representing a plurality of seismic input traces acquired by one or more seismic sensors. The system also includes a processor unit coupled to the storage device and configured to stack the plurality of seismic input traces into a stacked trace, generate a function of similarity between at least two of the plurality of seismic input traces, scale at least one of the seismic input traces or the stacked trace with the function of similarity, and generate image data representative of at least one of the scaled at least one seismic input trace, the scaled stacked trace, or a derived property from the scaled at least one seismic input trace or the scaled stacked trace. The system also includes a display device coupled to the processor unit and configured to display the generated image data.

In another embodiment, a sample computer readable storage medium includes instructions that when executed stack a plurality of seismic input traces acquired by one or more seismic sensors into a stacked trace. The instructions further generate, utilizing at least one processor unit, a function of similarity between at least two of the plurality of seismic input traces. The instructions further scale at least one of the seismic input traces or the stacked trace with the function of similarity.

In another embodiment, an example method of processing seismic data includes generating, utilizing at least one processor unit, a function of similarity between at least two of a plurality of seismic input traces. The method also includes scaling at least one of the seismic input traces or a stacked trace with the function of similarity.

DETAILED DESCRIPTION

The present disclosure relates to methods and apparatuses to help reduce noise in seismic data during data processing. For example, the signal-to-noise ratio of 2D and/or 3D seismic images can be improved by enhancing relevant portions of prestack seismic data and/or deemphasizing irrelevant portions (e.g., noisy portions) of the prestack seismic data. When the enhanced prestack seismic data is later imaged, the resulting image may have less noise and fewer false-positive high-amplitude data points. The methods and apparatuses described herein can be used to image passive seismic data, such as that recorded during microseismic monitoring (e.g., in a diffraction stack imager) to help locate seismic sources and/or events. Additionally, the methods and apparatuses described herein can be applied to Kirchhoff migration techniques, reverse time migration techniques, and many other migration and seismic imaging methodologies. Furthermore, the methods and apparatuses described herein can be applied in many circumstances where the number of measurements is small and the noise is high, such as data acquired in deep boreholes in, for example, dipole sonic imaging.

A method to reduce the noise prior to imaging of seismic data is disclosed. A function of similarity is generated that captures the similarity of traces (optionally after the data has been corrected). This function of similarity may be used to scale the resulting stacked trace or one (or more) of the raw data seismic input traces to highlight events in the data that are similar and as such reduce the noise. A scaled stacked trace, for example, can then be used in a standard imaging procedure to image the seismic data.

With reference to the operations 100 illustrated in the flow chart of FIG. 1, one embodiment of seismic noise reduction will now be described. In operation 110 a plurality of seismic input traces may be corrected. Each of the plurality of seismic input traces may be recorded at a seismic sensor, and may correspond to a measured vertical component of motion (such as acceleration, velocity, and displacement). In some embodiments, multiple components of motion (e.g., 3 orthogonal components) may be recorded on a plurality of different traces, and, in marine-based systems, one or more pressure and/or particle motion components may be recorded on one or more traces. In some time-lapse measurement systems, a plurality of traces may be recorded on a single seismic sensor, whereas in other systems, each of the plurality of traces may be recorded on different seismic sensors.

The correction in operation 110 may include, for example, moveout correction of the seismic input traces in order to compensate the arrival or travel times due to the spatial separation between different offsets of seismic sensors (and the separation of the sensor or sensors from the source or sources in some embodiments). As another example, the correction in operation 110 may include flattening the seismic input traces with, for example, respect to time or depth. The seismic traces in some examples may be flattened with a ray traced travel time curve, or wave-propagation-based methods may be used. The correction in operation 110 may, in some examples, include depth or time migration of the plurality of seismic input traces. The correction may help normalize the seismic input traces in some embodiments. In some embodiments, multiple correcting methods may be used; however, operation 110 may alternatively be skipped in situations where, for example, the seismic input traces do not need to be corrected.

In operation 112, the seismic input traces are stacked into a stacked trace. For example, each sample of the seismic input traces may be summed and/or averaged across some or all of the seismic input traces as a function of time, depth, or some other domain. In some embodiments, a single stacked trace may be generated by operation 112; in other embodiments two or more stacked traces may be generated. In some embodiments, operation 112 may also be skipped, such as where semblance will be used to generate the function of similarity and the seismic input traces will be scaled with the function of similarity, rather than the stacked trace.

In operation 114, a function of similarity (or similarity function) may be generated responsive to the seismic input traces and/or (in some embodiments) responsive to the stacked trace. For example, the function of similarity may be indicative of the similarity between two or more of the seismic input traces over a plurality of samples in the seismic input traces. In some embodiments, as described in more detail below, the two or more seismic input traces may be combined with the stacked trace (e.g., the stacked trace subtracted from the input trace), and the individual seismic input traces and/or combined trace may be compared against other individual seismic input traces and/or combined traces. The function of similarity may be responsive to similarities between less than all of the seismic input traces (e.g., two or more), or responsive to similarities between all of the seismic input traces.

The function of similarity is a function of a sample domain, such as the time domain, the depth domain, the offset domain, or some other domain. As described in more detail below, the function of similarity may include one or more different measures of similarity, including for example covariance, semblance, measures of difference or separation, and so forth. The function of similarity includes a plurality of measurements of similarity, each individual measurement of similarity corresponding to a sample (e.g., a particular time sample, a particular depth sample, etc.) of the seismic input traces.

The function of similarity may be normalized in some cases in order to, for example, maintain the proportional amplitude of the stacked trace before scaling with the function of similarity, as described in more detail below. To normalize the function of similarity, each of the measurements of similarity is scaled, for example, by dividing each of the measurements of similarity by the amplitude of the measurement of similarity with the greatest amplitude.

In some cases, missing samples in the function of similarity may be interpolated from adjacent samples in the function of similarity.

Referring now to operation 120, the stacked trace may be scaled or weighted with the function of similarity as a function of the sample domain (e.g., time, depth, etc.). In a time domain example, each measurement of similarity of the function of similarity is multiplied with respective time samples of the stacked trace to create a scaled, stacked trace.

Alternatively, referring to operation 122, one or more of the seismic input traces may be scaled or weighted with the function of similarity as a function of the sample domain.

Following operation 120 and/or 122, an imaging condition may be applied to the scaled stacked trace or input traces in order to generate a data point in a 3D plot representing a portion of the Earth's subsurface at one of a plurality of spatial locations. Standard imaging conditions, typically used in imaging of passive seismic data, such as micro-seismic data, may be employed. For example, the maximum amplitude of a scaled, stacked trace may be plotted in a corresponding location of the 3D plot representing the portion of the subsurface. For each spatial location in that portion of the Earth's subsurface, the operations 100 may be applied to appropriate seismic input traces, with the results of each iteration of operations 100 producing a data point in the 3D plot. This type of 3D plot may be useful, as just one example, in micro-seismic imaging to help identify a source location of a micro-seismic event. Of course, the scaled trace or traces may similarly be employed in other types of imaging techniques.

With reference now to the operations 200 illustrated in the flow chart of FIG. 2, one embodiment of generating a function of similarity (such as that described above with reference to operation 114 in FIG. 1) will be described. In operation 202, a first sample window is selected. The first sample window may be a subset of the entire window of the seismic input traces and the size of the first window may in some embodiments be larger than the dominant period or cycle of a source wavelet (which is a seismic signal pulse, such as a seismic event created by a rock fracturing, a response from a subsurface reflector, etc.). For example, the sample window may be approximately three times larger than the dominant period or cycle of a wavelet from an anticipated seismic event. In one particular micro-seismic application, the sample window may be approximately 150 ms or approximately three times as long as the dominant period of an anticipated micro-seismic event (such as the event generated by the fracturing of a rock).

In other examples, however, the sample window may be smaller than the dominant period or cycle of a wavelet from an anticipated seismic event, for example one third the dominant period or cycle of the wavelet. A sample window that is smaller than a dominant period or cycle of a wavelet from an anticipated seismic event may be useful to help pick event arrival times, or for picking velocities or velocity analysis. In the event the sample domain is the depth domain, the sample window may similarly be greater or lesser than the wavelength of a wavelet from an anticipated seismic event.

In general, the size of the sample window may be user defined, and may depend on the type of anticipated wavelet or seismic event. In some examples, the sample window may be designed in order to try to isolate a single anticipated seismic event, but not be so large as to possibly encompass multiple, different seismic events (and other noise). Furthermore, in some embodiments, the window may be selected to characterize the noise, rather than the signal, in order to differentiate the noise from the signal.

Based on the selected first sample window from operation 202, a covariance matrix may be calculated for two or more of the input traces over the selected first sample window in operation 204. As described above, in some embodiments the covariance matrix may be calculated based on only a subset of the seismic input traces, whereas in other embodiments, the covariance matrix may be based on all of the seismic input traces. In those embodiments where only a subset of the seismic input traces are used, the covariance matrix may be smaller, or missing elements may be interpolated from elements that are calculated.

The covariance matrix may measure the cross correlation between traces from different traces (e.g., at different offsets) averaged over the first sample window. In the time domain, the elements of the covariance matrix for a time window may be defined by $$C_{ij} = \frac{1}{N-1} \sum_{k=1}^{N} (t_{ki} - \overline{t_k})(t_{kj} - \overline{t_k}) \qquad \text{(Equation 1)}$$

where $C_{ij}$ denotes the covariance in the respective time window between the seismic input trace i and the seismic input trace j, $t_{ki}$ is the $k^{th}$ sample in seismic input trace i, N is the number of samples in the respective time window, and $\overline{t_k}$ is the $k^{th}$ sample in the stacked trace (or possibly a scaled version of the stacked trace). In Equation 1, the different traces may be treated as the independent variables and the different time samples as different observations. Of course other independent variables and observations may be used in different covariance matrix calculations.

As shown in Equation 1, each sample in a first seismic input trace being compared has a corresponding sample of the stacked trace subtracted from it, and this difference is multiplied by the difference of a corresponding sample in the seismic input trace against which the former is being compared and the corresponding sample of the stacked trace. The product of these two terms is averaged over the time samples within the time window. In examples where the sample domain is another domain, Equation 1 may similarly be used with respect to a selected window of the respective domain.

The elements of the covariance matrix may generally have a relatively high amplitude when the traces being compared are similar (e.g., are representative of a seismic event of interest) within the sample window, and the elements of the covariance matrix may generally have a relatively low amplitude when the traces being compared are dissimilar (e.g., are representative of noise) within the sample window.

After the covariance matrix for the first sample window (or at least a portion thereof) is generated in operation 204, a mean may be derived from the covariance matrix in operation 206. The mean may be determined by summing all of the elements of the covariance matrix and dividing the resulting sum by the number of elements in the covariance matrix. In other embodiments, the mean may be determined by performing another statistical operation on some or all of the elements of the covariance matrix. The mean for the first sample may be a first measurement of similarity as described above, and, for a time sample window, may be used to generate the function of similarity in that the mean corresponding to the first time window may be the amplitude of the function of similarity at a time corresponding to the middle of the first time window.

With reference now to operation 208, the sample window (from the first sample window) may be slid by one or more samples—for example, may slide by one time sample. Although typically the second sample window is the same size as the first sample window (and the same as the third sample window, the fourth sample window, and so forth), in some cases the size of the sample windows may be varied. The second sample window is thus selected in operation 210 as a result of sliding the sample window, following which a second covariance matrix for the second sample window is calculated in operation 212 and a mean value is derived from the second covariance matrix in operation 214, similar to the calculation of the first covariance matrix in operation 204 and the calculation of the first mean in operation 206, except that a different sample window is used (i.e., the second sample window). Following operations 212 and 214, the sample window is again slid by one or more samples, and a third covariance matrix and corresponding mean are calculated, the sample window is again slid, and so forth, until the sample window has slid throughout the desired portion of the seismic input traces and stacked trace (which may be an entire trace, or only a fraction thereof).

Although operations 200 have been described with reference to one measure of similarity (covariance), many other suitable measures of similarity may alternatively or additionally be used to generate the function of similarity described in operation 114. As just one additional example, semblance values may be used to generate the function of similarity. In this case, the function of similarity may similarly be generated by sliding a sample window along the seismic input traces and calculating the semblance within each respective window. When using semblance, the stacked seismic trace may not be required. The semblance of a plurality of seismic input traces within a given sample window may be given by $$S = \frac{\sum_{i=1}^{N}\left(\sum_{j=1}^{M} t_{ij}\right)^2}{M \sum_{i=1}^{N} \sum_{j=1}^{M} t_{ij}^2}$$ (Equation 2)

where $t_{ij}$ is the $i^{th}$ sample in seismic input trace j, N is the number of samples in the sample window, M is the number of seismic input traces, and S is the semblance value for the particular sample window.

In other embodiments, however, still other measures of similarity between some or all of the seismic input traces may be used to generate the function of similarity. As just one additional example, the correlation matrix may be used in place of the covariance matrix. In some cases, more than one measure of similarity may be used to generate the function of similarity.

With reference now to the operations 300 illustrated in the flow chart of FIG. 3, one embodiment of seismic noise reduction will now be described. In operation 302, a plurality of seismic input traces may be corrected, similar to operation 110 in FIG. 1. Next, in operation 304, the corrected seismic input traces may be stacked in order to create a stacked trace. In operation 306, a covariance matrix may be generated for each of a plurality of sample windows, similar to operation 204, and in operation 308, a mean value of all of the elements in each covariance matrix may be generated, similar to operation 206. The mean values of all of the elements of the covariance matrix for each of the plurality of respective covariance matrices corresponding to the plurality of sample windows may be used to generate a function of similarity in operation 310. In operation 312, the stacked trace may be scaled with the function of similarity generated in operation 310. Operations 302 through 312 may be entirely completed in some examples before the seismic data is imaged using standard imaging conditions.

Figure 4:
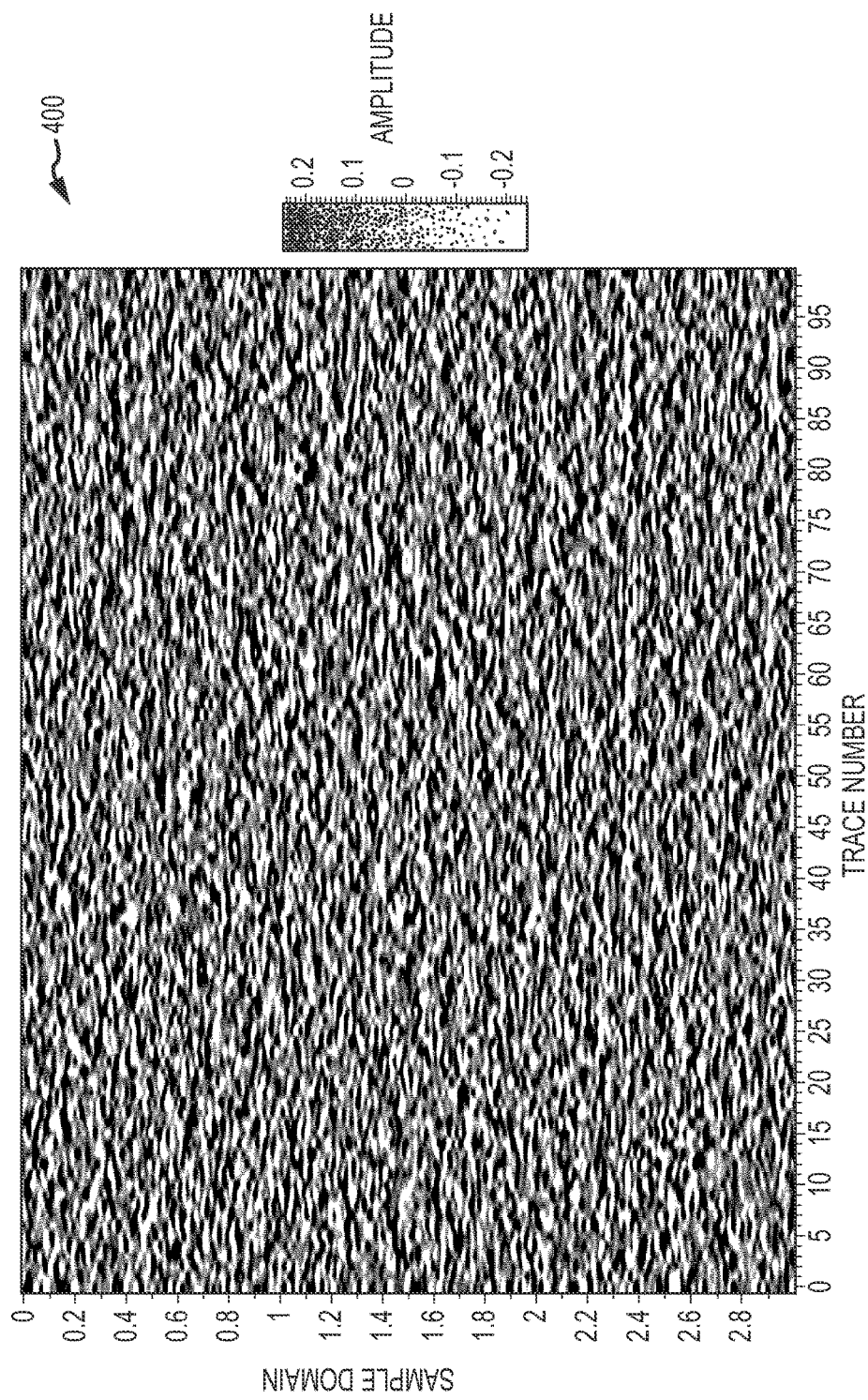
FIG. 4 is a plot of a plurality of seismic input traces.
Figure 5:
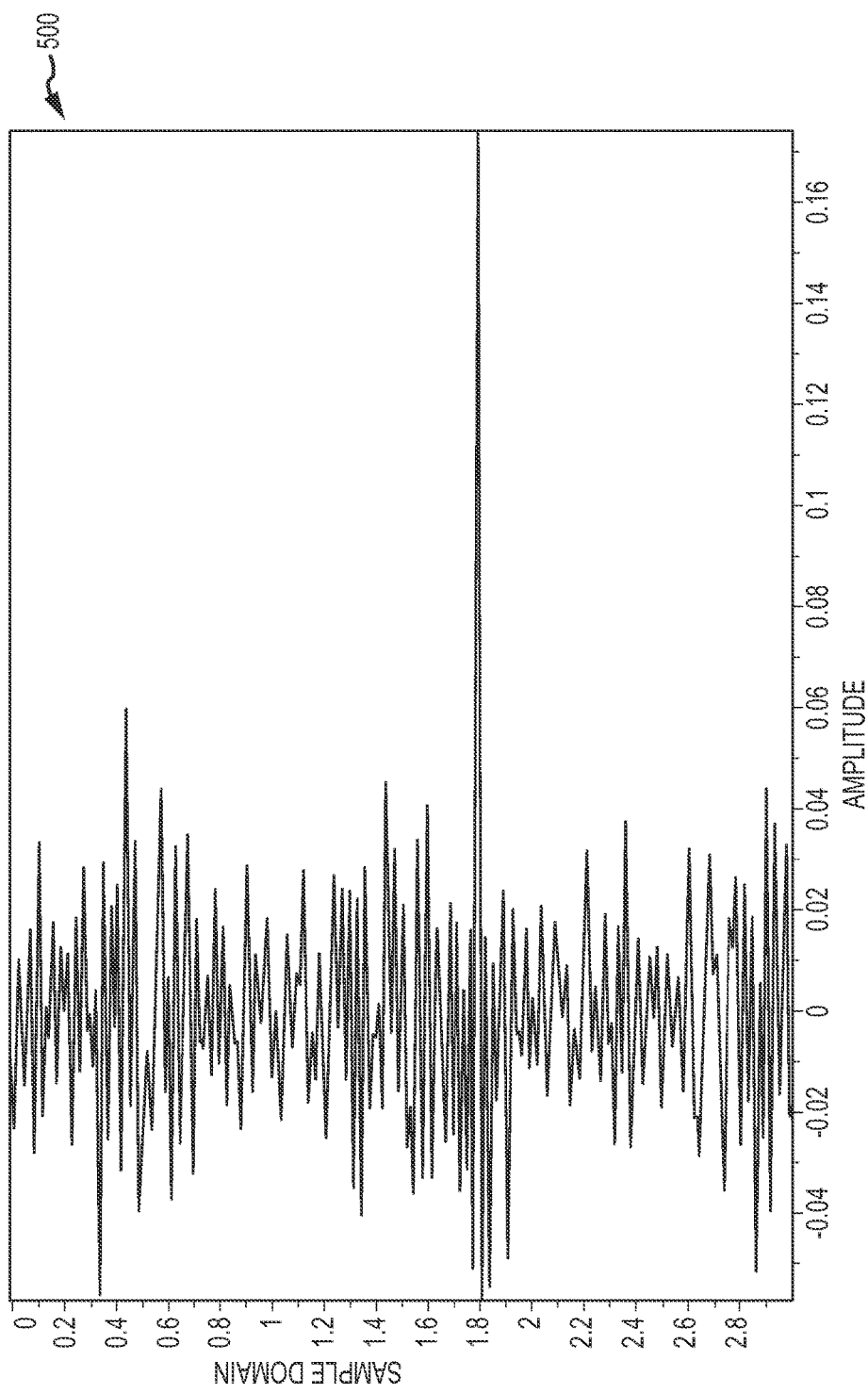
FIG. 5 is a plot of a stacked seismic trace corresponding to the plurality of seismic input traces in FIG. 4.
Figure 6:
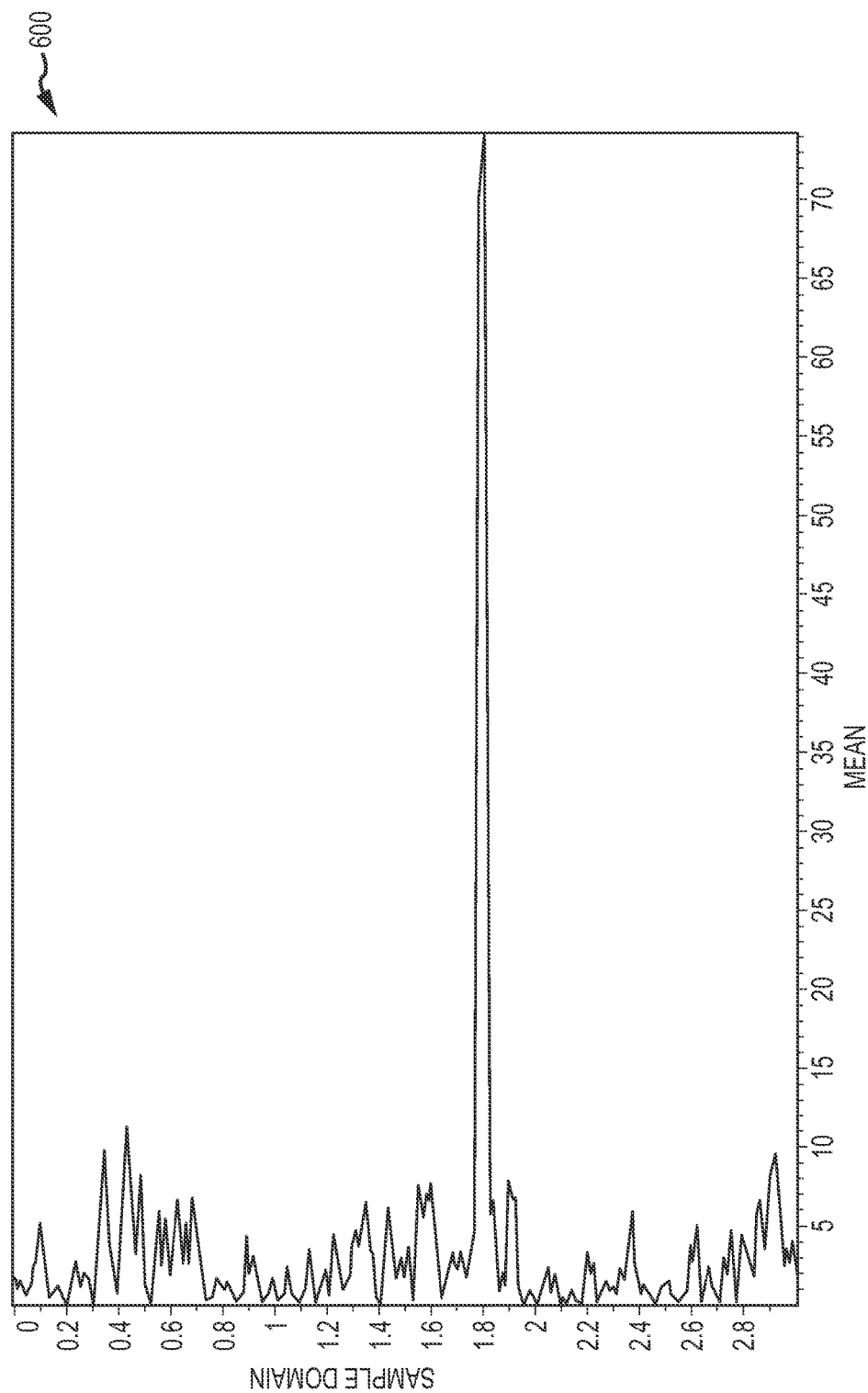
FIG. 6 is a plot of one example of a function of similarity corresponding to the plurality of seismic input traces in FIG. 4.
Figure 7:
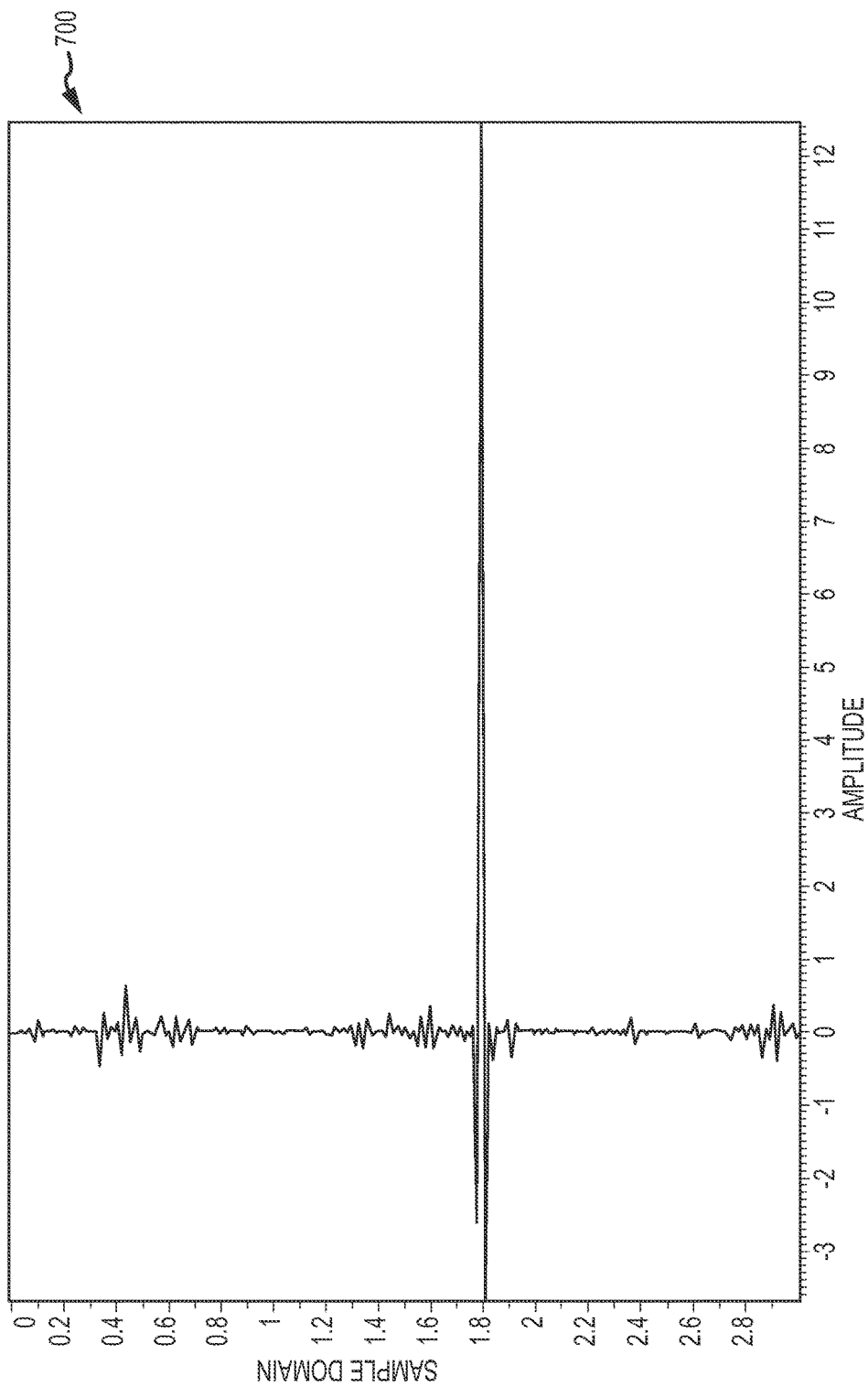
FIG. 7 is a plot of the stacked trace in FIG. 5 that has been scaled by the function of similarity in FIG. 6.

With reference now to FIGS. 4 through 7, an application of operations 100 or 300 will now be given in the context of a synthetic experiment. FIG. 4 is a plot 400 of a plurality of noisy seismic input traces. A synthesized seismic event has been injected into the noisy traces at approximately 1.8 (which may be a measure of seconds in a time domain example), and the seismic traces have been corrected (e.g., as in operation 110 or 302) by flattening them in the relevant domain. As can be appreciated, even though the seismic input traces have been flattened, the traces are very noisy and the injected seismic event is very difficult to discern. Referring now to FIG. 5, the seismic input traces in FIG. 4 may be stacked to create the stacked trace (e.g., as in operation 112 or 304) seen in plot 500. As can be appreciated, a seismic event centered around 1.8 is now visible, although there is still substantial noise on the stacked trace. This noise may subsequently impact the quality of the imaging when an imaging condition is applied to the stacked trace. Referring now to FIG. 6, a plot 600 of a function of similarity (e.g., as in operation 114) for the seismic input traces in FIG. 4 is shown. In this particular example, the function of similarity is a mean of all of the elements of respective covariance matrices that were calculated for each of a plurality of sample windows (e.g., as in operations 202 through 216). With reference now to FIG. 7, a plot 700 of the stacked trace of FIG. 5 has been scaled with the function of similarity of FIG. 6 to create a scaled, stacked trace. As can be appreciated by comparing the unscaled, stacked trace of FIG. 5 with the scaled, stacked trace of FIG. 7, scaling the stacked trace with the generated function of similarity has significantly reduced the noise on the scaled, stacked trace and thereby increased its signal-to-noise ratio as compared with the unscaled, stacked trace.

Figure 8:
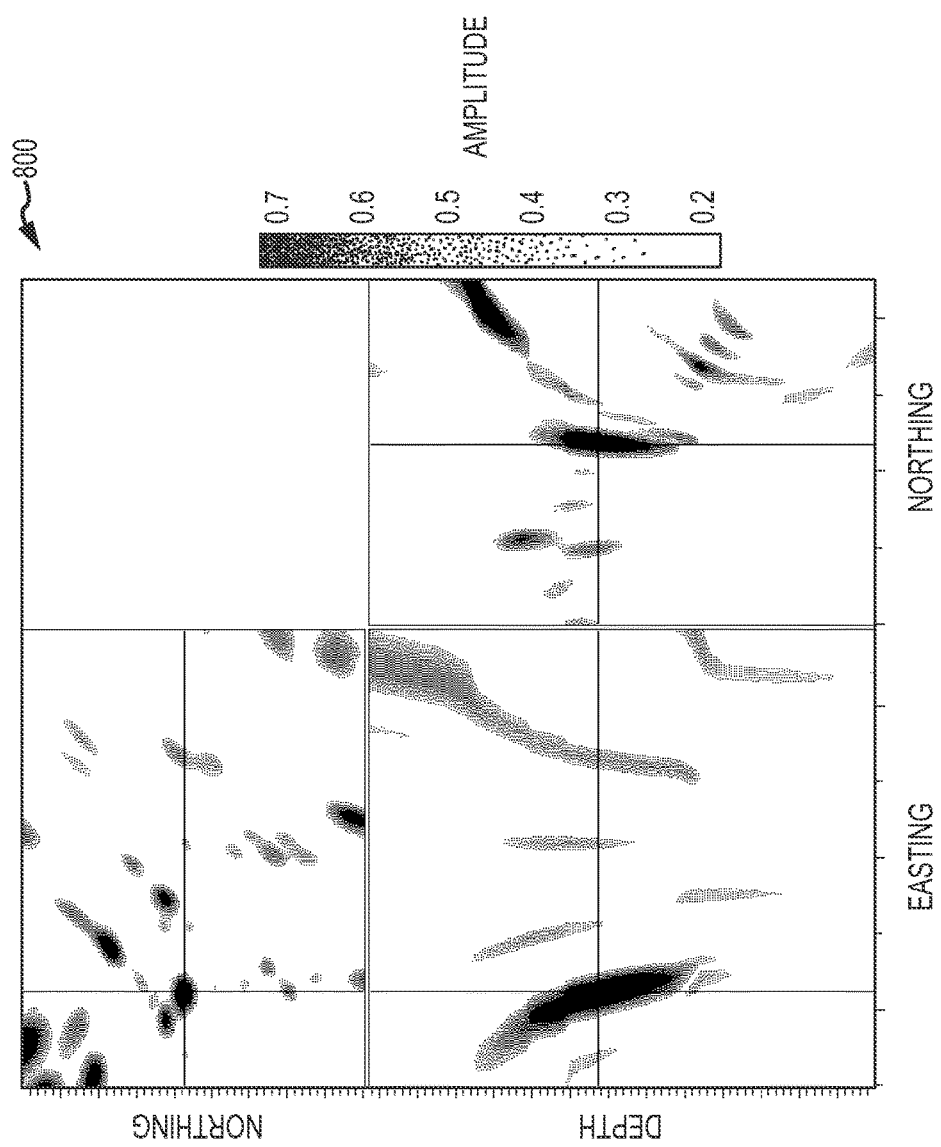
FIG. 8 is a plot of an imaged seismic dataset, wherein the data has been scaled by a function of similarity prior to imaging.
Figure 9:
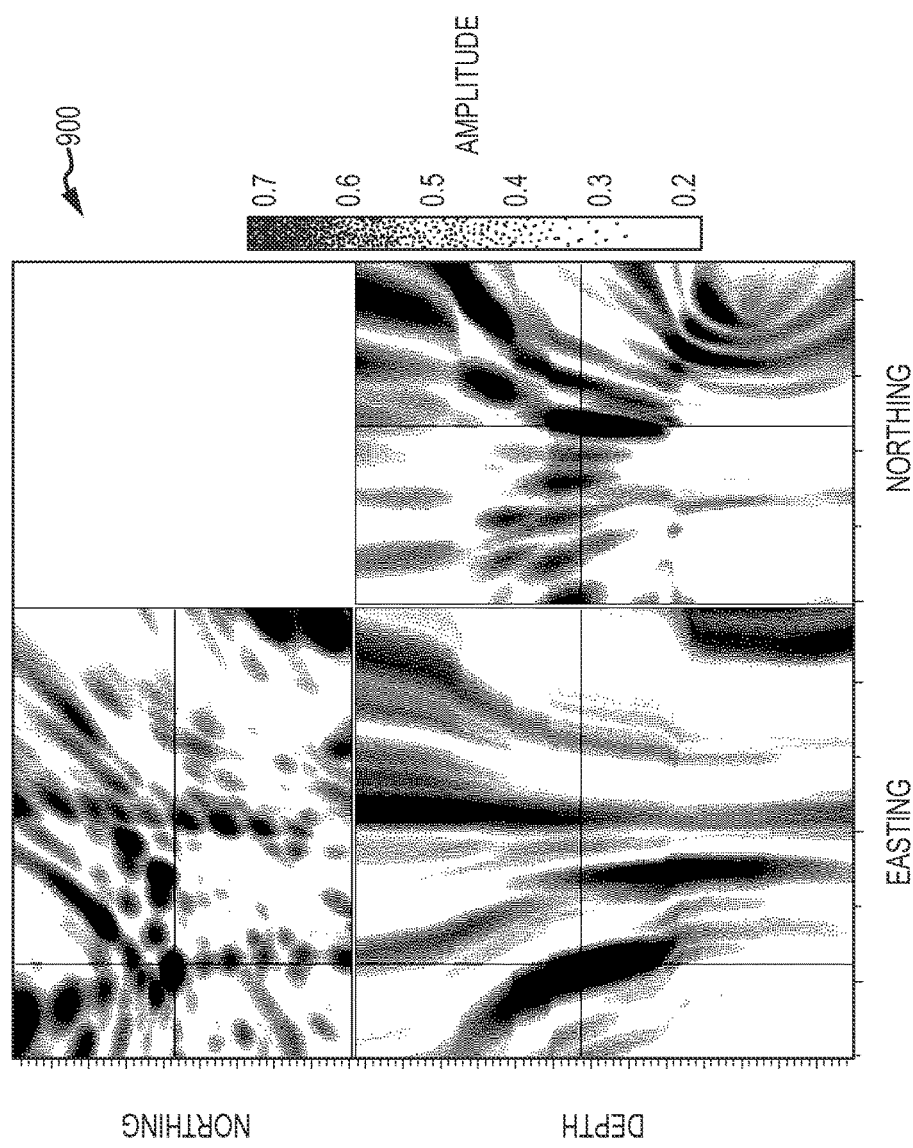
FIG. 9 is a plot of an imaged seismic dataset, wherein the data has not been scaled by a function of similarity prior to imaging.

With reference now to FIGS. 8 and 9, a comparison is made between seismic data that has been imaged after processing in accordance with operations 100, 200, and/or 300 and seismic data that has not been so processed. In FIG. 8, a plot 800 of an imaged seismic event is shown, wherein the underlying seismic trace data was scaled by a function of similarity among seismic input traces before imaging. In FIG. 9, by comparison, a plot 900 of an imaged seismic event is shown, wherein the underlying seismic trace data was not scaled by a function of similarity among the seismic input traces prior to imaging the data. An imaged seismic event (similar to the simulated event injected at time 1.8 in FIG. 4) is indicated in the cross hairs of both FIG. 8 and FIG. 9 for convenience. As can be appreciated, in the 3D plot 900 in FIG. 9, several false-positive high-amplitude data points appear due to the presence of noise in the stacked trace, whereas in the plot 800 in FIG. 8, most of the false-positive data points have been reduced or eliminated entirely.

Figure 2:
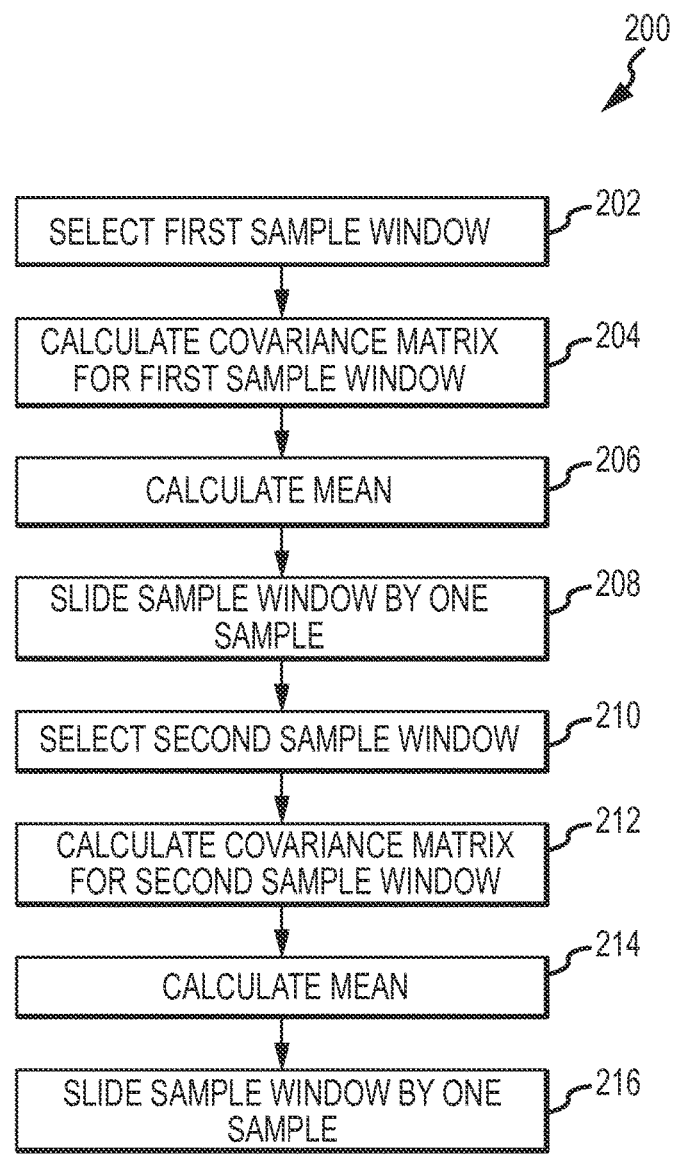
FIG. 2 is a flowchart of a method for generating one example of a function of similarity.
Figure 3:
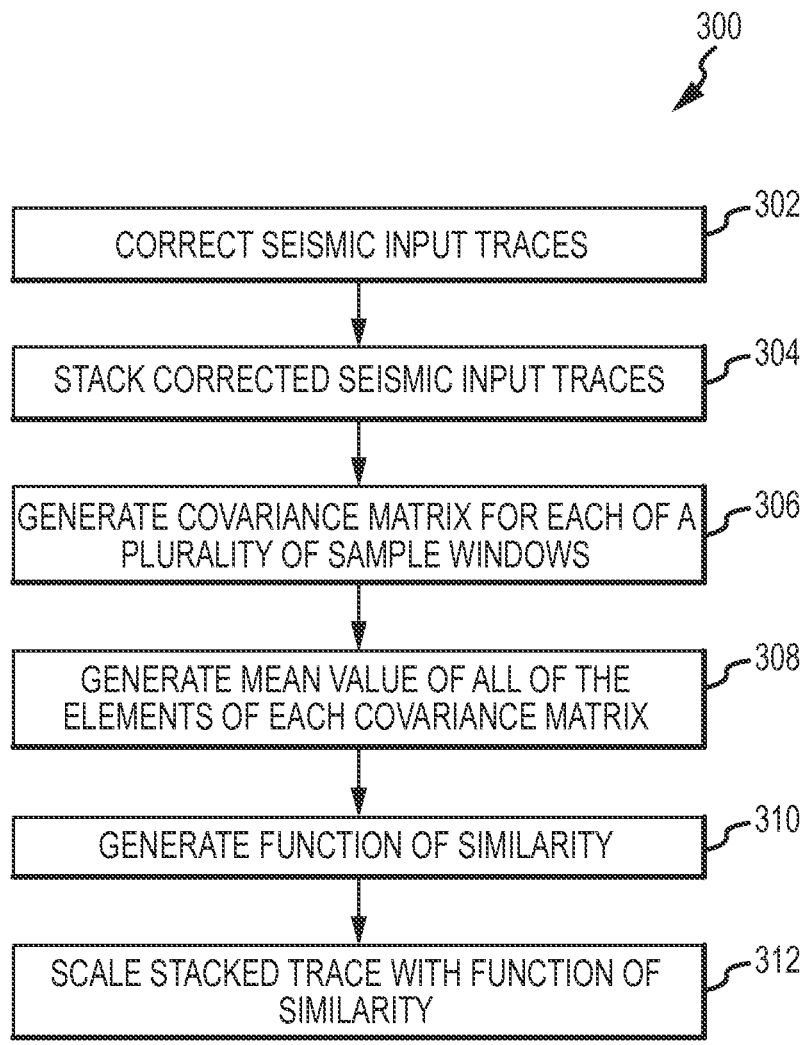
FIG. 3 is a flowchart of a method for seismic noise reduction.
Figure 10:
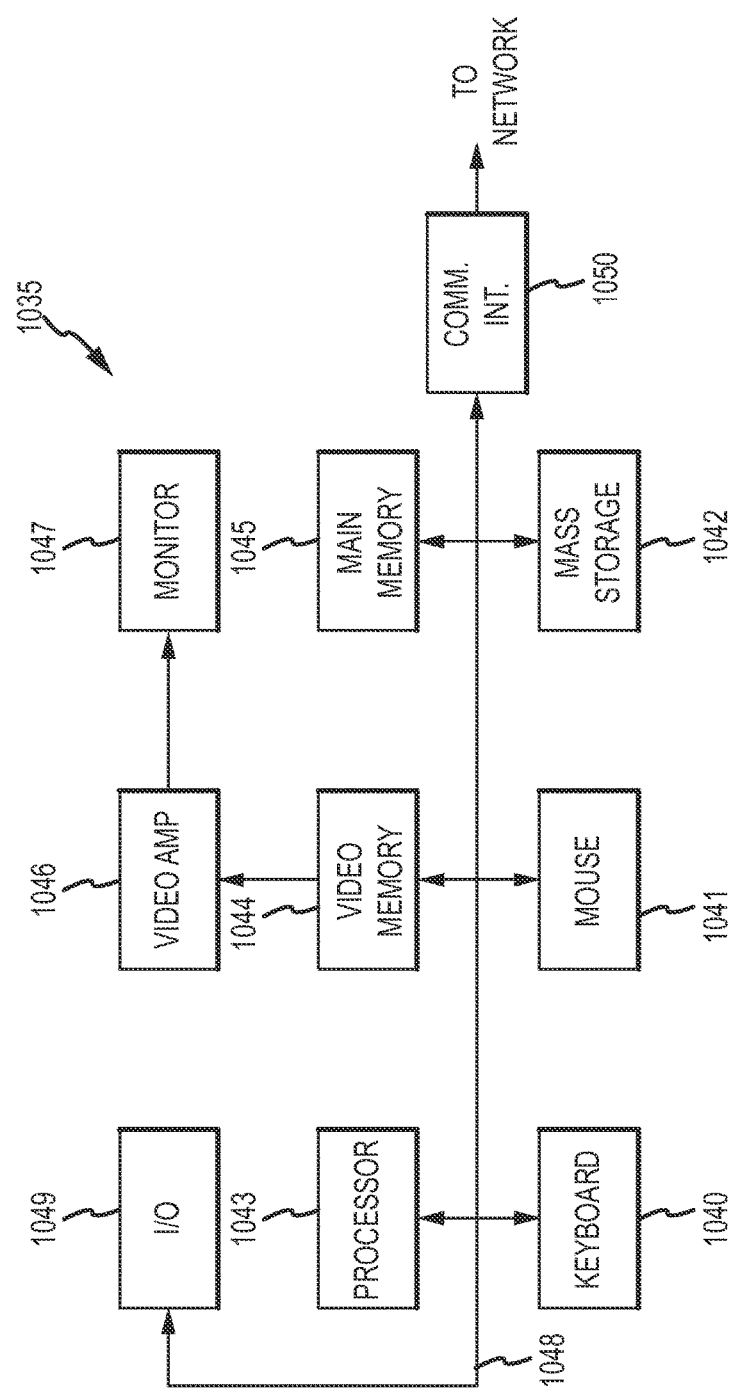
FIG. 10 illustrates an embodiment of a computer system capable of seismic noise reduction.

FIG. 10 illustrates an embodiment of a computer system 1035 capable of seismic noise reduction, including for example, a system capable of executing the operations in FIGS. 1 through 3. In some embodiments, the computer system 1035 may be a personal computer and/or a handheld electronic device. In other embodiments, the computer system 1035 may be an implementation of enterprise level computers, such as one or more blade-type servers within an enterprise. In still other embodiments, the computer system 1035 may be any type of server. The computer system 1035 may be onboard a vessel, may be on a remotely controlled drone vessel, may be on land in a vehicle, may be in land in a facility, or any other place.

A keyboard 1040 and mouse 1041 may be coupled to the computer system 1035 via a system bus 1048. The keyboard 1040 and the mouse 1041, in one example, may introduce user input to the computer system 1035 and communicate that user input to a processor 1043. Other suitable input devices may be used in addition to, or in place of, the mouse 1041 and the keyboard 1040. An input/output (I/O) interface 1049 coupled to the system bus 1048 represents such I/O elements as a printer, audio/video, etc. The I/O interface 1049 may be configured to receive seismic data, such as the data underlying the seismic input traces illustrated in FIG. 4, and/or such data may be provided to the computer system 1035 via the mass storage 1042, the communication interface 1050, and so forth.

Computer 1035 also may include a video memory 1044, a main memory 1045 and a mass storage 1042, all coupled to the system bus 1048 along with the keyboard 1040, the mouse 1041 and the processor 1043. The mass storage 1042 may include both fixed and removable media, such as magnetic, optical or magnetic optical storage systems and any other available mass storage technology. The bus 1048 may contain, for example, address lines for addressing the video memory 1044 or the main memory 1045.

The mass storage 1042 may be configured to store many different types of seismic data, such as data representative of a scaled seismic input trace, a scaled stacked trace, a derived property from a scaled input trace or a scaled stacked trace, as well as other types of seismic data.

The system bus 1048 also may include a data bus for transferring data between and among the components, such as the processor 1043, the main memory 1045, the video memory 1044 and the mass storage 1042. The video memory 1044 may be a dual-ported video random access memory. One port of the video memory 1044, in one example, is coupled to a video amplifier 1046, which is used to drive one or more monitor(s) 1047. The monitor(s) 1047 may be any type of monitor suitable for displaying graphic images, such as a cathode ray tube monitor (CRT), flat panel, or liquid crystal display (LCD) monitor or any other suitable data presentation device. The monitor(s) 1047 may be used to display information representative of seismic data, such image data that may be shown in any of FIGS. 4 through 9, and/or many other types of seismic and/or image data, including one or more properties derived from a scaled, stacked trace or a scaled seismic input trace.

The computer system includes a processor unit 1043, which may be any suitable microprocessor or microcomputer. The processor unit 1043 may access seismic data, such as data representative of a plurality of seismic input traces received by one or more seismic sensors, and may be configured to manipulate the seismic data (such as by removing noise from the seismic data, applying imaging conditions to the seismic data, and so forth, some examples of which are described above with reference to FIGS. 1 through 9). The computer system 1035 also may include a communication interface 1050 coupled to the bus 1048. The communication interface 1050 provides a two-way data communication coupling via a network link. For example, the communication interface 1050 may be a satellite link, a local area network (LAN) card, a cable modem, and/or wireless interface. In any such implementation, the communication interface 1050 sends and receives electrical, electromagnetic or optical signals that carry digital data streams representing various types of information.

Code or instructions received by the computer system 1035 may be executed by the processor 1043 as the code is received, and/or stored in the mass storage 1042, or other non-volatile storage for later execution. In this manner, the computer system 1035 may obtain program code in a variety of forms. Program code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices. Regardless of the actual implementation of the computer system 1035, the data processing system may execute operations that help reduce noise in seismic data, as described above for example with reference to FIGS. 1 through 9.

The apparatuses and associated methods in accordance with the present disclosure have been described with reference to particular embodiments thereof in order to illustrate the principles of operation. The above description is thus by way of illustration and not by way of limitation. Various modifications and alterations to the described embodiments will be apparent to a person of skill in the art in view of the teachings herein. For example, under the teachings of the present disclosure a person of skill in the art may be able to devise numerous systems, arrangements and methods which, although not explicitly shown or described herein, embody the principles described and are thus within the spirit and scope of this disclosure. Such systems, arrangements and methods may include combinations of the various embodiments described herein. For example, as described above, the methods and apparatuses described herein may be applicable to imaging of passive seismic data such as that recorded during micro-seismic monitoring, but may similarly be applicable to other types of seismic data processing, such as velocity model building, migration analysis, and so forth. Many other modifications, combinations, and other arrangements are similarly possible and within the spirit and scope of the present disclosure. Accordingly, it is intended that all such alterations, variations, and modifications of the disclosed embodiments are within the scope of this disclosure as defined by the appended claims.

As another example of a possible modification, although the present disclosure refers to covariance and semblance as two different measures of similarity, many other suitable measures of similarity (such as correlation), or other appropriate statistical operations may be used to generate the function of similarity in, for example operation 114.

In addition, in methodologies directly or indirectly set forth herein, various steps and operations may be described in one possible order of operation, but those skilled in the art will recognize that the steps and operations may be rearranged, replaced, or eliminated without necessarily departing from the spirit and scope of the disclosed embodiments.

All relative and directional references (including: north, south, west, east, top, bottom, upward, downward, side, above, below, and so forth) are given by way of example to aid the reader's understanding of the particular embodiments described herein. They should not be read to be requirements or limitations, particularly as to the position, orientation, or use of the invention. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

What is claimed is:

1. A method for reducing noise in geophysical data processing and imaging of acquired seismic data, the method comprising:
   accessing seismic data representative of a plurality of seismic input traces acquired by one or more seismic sensors, wherein each of the plurality of seismic input traces is recorded at a seismic sensor;
   stacking the plurality of seismic input traces into a stacked trace;
   generating, utilizing at least one processor unit, a function of similarity between at least two of the plurality of seismic input traces, wherein the function of similarity comprises a plurality of respective measurements of similarity generated from a plurality of covariance matrices measuring the similarity of the seismic input traces over a respective plurality of sample windows;
   calculating the similarity between the respective plurality of sample windows in the at least two of the plurality of seismic input traces and corresponding sample windows in the stacked trace, wherein the sample windows are selected to differentiate noise from signal in the seismic data;
   scaling at least one of the seismic input traces or the stacked trace with the function of similarity, wherein scaling with the function of similarity reduces the noise;
   applying an imaging condition to the scaled stacked trace or input traces to generate image data representing a portion of the Earth's subsurface; and
   displaying the image data representing a portion of the Earth's subsurface on a display device coupled to the processor unit.

2. The method of claim 1, further comprising storing data representative of at least one of the scaled at least one seismic input trace, the scaled stacked trace, or a derived property from the scaled at least one seismic input trace or the scaled stacked trace in a computer readable tangible storage medium.

3. The method of claim 1, further comprising the image data being representative of at least one of the scaled at least one seismic input trace, the scaled stacked trace, or a derived property from the scaled at least one seismic input trace or the scaled stacked trace.

4. The method of claim 1, wherein the function of similarity is a function of a sample domain of the seismic input traces, and wherein the sample domain is a time domain or a depth domain.

5. The method of claim 1, wherein the respective measurements of similarity are generated by:
   selecting a first sample window of the plurality of sample windows;
   calculating a first measurement of the similarity for the first sample window;
   sliding the first window by at least one sample to select a second sample window of the plurality of sample windows; and
   calculating a second measurement of the similarity for the second sample window.

6. The method of claim 1, wherein at least one of the respective measurements of similarity is generated responsive to similarities between all of the plurality of input traces.

7. The method of claim 1, wherein at least one of the respective sample windows is approximately three times a dominant wavelength of an anticipated seismic event.

8. The method of claim 1, wherein a size of at least one of the plurality of sample windows is designed to isolate an anticipated seismic event.

9. The method of claim 1, wherein the respective plurality of sample windows in the at least two of the plurality of seismic input traces form a first plurality of sample windows, and the corresponding sample windows in the stacked trace form a second plurality of sample windows.

10. The method of claim 9, wherein at least one of the plurality of measurements of similarity comprises a mean derived from a covariance matrix for a respective one of the first plurality of sample windows and a corresponding respective one of the second plurality of sample windows.

11. The method of claim 9, further comprising:
    generating the respective covariance matrix for each of the respective first and second pluralities of sample windows using the at least two of the plurality of input traces; and
    generating the respective measurements of similarity by determining a mean of each respective covariance matrix.

12. The method of claim 11, wherein the mean is determined by summing all elements of each respective covariance matrix and dividing a resulting sum by a number of the elements in each respective covariance matrix.

13. The method of claim 11, wherein elements of the covariance matrix for each respective sample window are generated by the equation $$C_{ij} = \frac{1}{N-1} \sum_{k=1}^{N} (t_{ki} - \overline{t_k})(t_{kj} - \overline{t_k})$$

where $C_{ij}$ denotes a covariance in a sample window between a seismic input trace i and a seismic input trace j, $t_{ki}$ is a $k^{th}$ sample in seismic input trace i, N is a number of samples in the sample window, and $\overline{t_k}$ is a $k^{th}$ sample in the stacked trace.

14. The method of claim 1, wherein the stacked trace is scaled with the function of similarity and further comprising applying the imaging condition to the scaled, stacked trace after it has been scaled with the function of similarity, such that scaling with the function of similarity reduces the noise prior to imaging the data.

15. The method of claim 1, wherein at least one of the seismic input traces is scaled with the function of similarity and said stacking of the seismic input traces is done after said scaling of the seismic input traces, such that scaling with the function of similarity reduces the noise prior to imaging the data.

16. A method of reducing noise in geophysical data processing and imaging for acquired seismic data, the method comprising:
  correcting a plurality of seismic input traces acquired by one or more seismic sensors, wherein each of the plurality of seismic input traces is recorded at a seismic sensor;
  stacking the corrected plurality of seismic input traces into a stacked trace;
  generating a plurality of covariance matrices measuring the similarity of the corrected seismic input traces over a respective plurality of sample windows, wherein the sample windows are selected to differentiate noise from signal in the seismic data;
  generating a plurality of mean values, each mean value representative of a plurality of elements of each respective covariance matrix, each mean value corresponding to one of the plurality of sample windows;
  combining the plurality of mean values into a function of similarity;
  scaling the stacked trace with the function of similarity, wherein scaling the stacked trace with the function of similarity reduces noise on the scaled, stacked trace as compared with the unscaled, stacked trace; and
  storing data representative of at least one of the scaled at least one seismic input trace, the scaled stacked trace, or a derived property from the scaled at least one seismic input trace or the scaled stacked trace in a computer readable tangible storage medium, wherein an imaging condition is applied to the scaled stacked trace or input traces to generate image data representing a portion of the Earth's subsurface; and
  displaying the image data on a display device, wherein the noise is reduced prior to imaging the data.

17. A system for reducing noise in geophysical data processing and imaging of acquired seismic data, the system comprising:
  a storage device for storing seismic data representing a plurality of seismic input traces acquired by one or more seismic sensors, wherein each of the plurality of seismic input traces is recorded at a seismic sensor;
  a processor unit coupled to the storage device and configured to:
    stack the plurality of seismic input traces into a stacked trace;
    generate a function of similarity between at least two of the plurality of seismic input traces;
    scale at least one of the seismic input traces or the stacked trace with the function of similarity, wherein scaling with the function of similarity reduces noise in the seismic data; and
    generate image data representative of at least one of the scaled at least one seismic input trace, the scaled stacked trace, or a derived property from the scaled at least one seismic input trace or the scaled stacked trace, wherein the function of similarity comprises a plurality of respective measurements of similarity, and wherein respective measurements in the function of similarity are generated from a plurality of covariance matrices measuring the similarity of the corrected seismic input traces over a respective plurality of sample windows;
    calculate the similarity between the respective plurality of sample windows in the at least two of the plurality of seismic input traces and corresponding sample windows in the stacked trace, wherein the sample windows are selected to differentiate the noise; and
  a display device coupled to the processor unit and configured to display the generated image data, wherein an imaging condition is applied to the scaled stacked trace or input traces to generate image data representing a portion of the Earth's subsurface, wherein the noise is reduced prior to imaging the data.

18. The system of claim 17, wherein each respective value in the function of similarity is a mean of each respective covariance matrix.

19. The system of claim 17, wherein elements of the covariance matrix for each respective sample window are generated by the equation $$C_{ij} = \frac{1}{N-1} \sum_{k=1}^{N} (t_{ki} - \overline{t_k})(t_{kj} - \overline{t_k})$$

where $C_{ij}$ denotes a covariance in a sample window between a seismic input trace i and a seismic input trace j, $t_{ki}$ is a $k^{th}$ sample in seismic input trace i, N is a number of samples in the sample window, and $\overline{t_k}$ is a $k^{th}$ sample in the stacked trace.

20. The method of claim 16, wherein elements of the covariance matrix for each respective sample window are generated by the equation:

$$C_{ij} = \frac{1}{N-1} \sum_{k=1}^{N} (t_{ki} - \overline{t_k})(t_{kj} - \overline{t_k}),$$

where $C_{ij}$ denotes a covariance in a sample window between a seismic input trace i and a seismic input trace j, $t_{ki}$ is a $k^{th}$ sample in seismic input trace i, N is a number of samples in the sample window, and $\overline{t_k}$ is a $k^{th}$ sample in the stacked trace.

* * * * *